United States Patent [19]

Frauenberger

[11] 4,338,981
[45] Jul. 13, 1982

[54] VALVE SERVICE APPARATUS

[76] Inventor: Dennis M. Frauenberger, 7915 E. Elm St., Houston, Tex. 77012

[21] Appl. No.: 137,397

[22] Filed: Apr. 4, 1980

[51] Int. Cl.³ .............................................. B65B 3/04
[52] U.S. Cl. ..................................... 141/85; 137/237; 141/98; 184/105 R
[58] Field of Search ........................ 141/2, 18, 98, 85; 137/237; 184/105 R, 105 B

[56] References Cited

U.S. PATENT DOCUMENTS 3,307,597  3/1967  Shugarman ........................ 141/18

*Primary Examiner*—Frederick R. Schmidt
*Attorney, Agent, or Firm*—Gunn, Lee & Jackson

[57] ABSTRACT

For servicing grease filled valves, wherein the valve has a cavity with packing grease therein, an apparatus is disclosed which in its preferred and illustrated embodiment includes a first detachable fitting enabling injection of packing grease into the cavity. A second and companion detachable fitting is also disclosed which utilizes an elongate stinger rod driven by a rotatable stem to upset a check valve drain plug wherein the second fitting has an outlet passage extending axially therethrough and connected through a lateral port.

5 Claims, 2 Drawing Figures

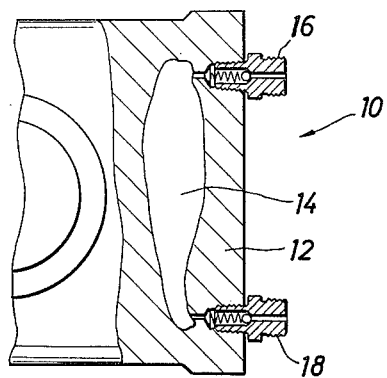
FIG. 1
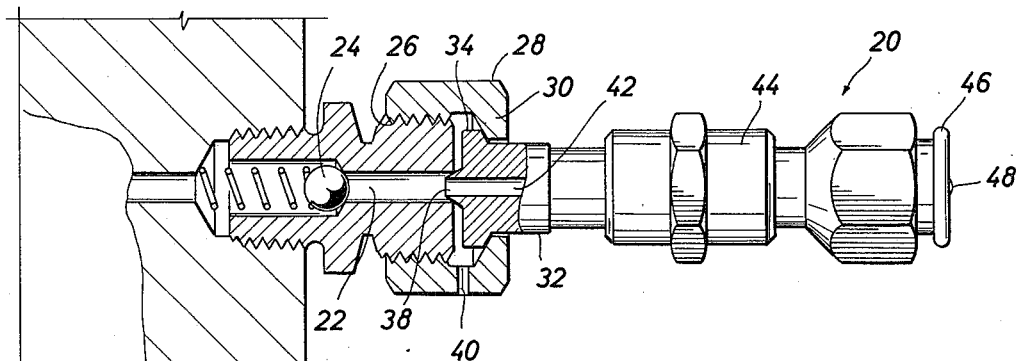
FIG. 2
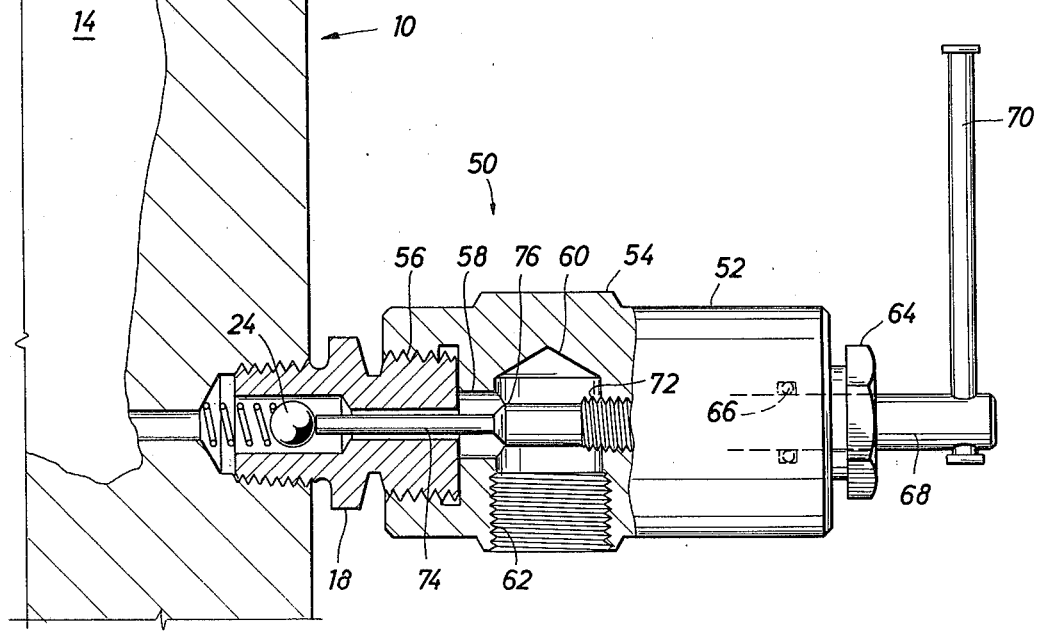

The valve 10 is the apparatus serviced by the present invention. For description purposes, the valve 10 is supporting structure for this disclosure. The valve 10 is constructed with two or more of the fittings 16 and 18. Their deployment may vary depending on the internal configuration of the cavity 14.

The numeral 20 identifies the inlet fitting of this disclosure. The fitting 20 cooperates with the fitting 16. The fitting 16 includes an internal passage 22. The passage opens to the exterior and extends to the interior past a ball check valve 24. The check valve is forced by a spring against a seat. The seat is an internal shoulder in the passage 22. The fitting is constructed with an external thread 26 to enable connection of the present invention. The fill fitting 20, to be distinguished from the fitting 16, is joined to it by an external coupling. The coupling 28 has an internal thread which mates with the thread 26. The coupling 28 has a radially inwardly directed shoulder 30. The shoulder 30 is constructed around a tubular member 32. The tubular member 32 terminates in a flared lip 34. The lip 34 is on the interior of the coupling. This clamps the coupling so that it can rotate and slide slightly. The tubular body 32 terminates at a protruding nipple 38. The nipple 38 is axially centered to penetrate the passage 22 slightly. The coupling 28 pulls the nipple 38 firmly against the passage so that a leak proof connection is achieved. Additionally, a weep passage or port 40 is formed in the coupling to the exterior.

The member 32 encloses an axial passage which terminates at the nipple 38, the passage being identified by the numeral 42. It also includes an enlarged portion 44 which, itself, encloses the components of a check valve (not shown). The check valve permits flow from the right to left as shown in FIG. 2 but prevents flow from left to right. In that sense, the check valve is serially installed with the check valve 24 shown in FIG. 2.

A peripherally surrounded lip 46 enables connection with a grease gun hose or the like to inject a suitable grease. There is, therefore, a passage extending from a check valve ball 48 through the fitting 44 and communicating with the passage 42. The fill fitting thus enables filling of the cavity 14 with a selected grease under pressure from some source.

The numeral 50 identifies the drain fitting. The drain fitting is attached to the permanent fitting 18. It will be recalled that this fitting is typically identical to the fitting 16. In particular, it includes an exposed axial passage, the passage terminating at an internal shoulder where a check valve element is located. The check valve is biased to prevent escape of grease. The check valve is used at the time of fabrication to fill the chamber if desired. However, no egress exists for the chamber 14.

The drain fitting 50 includes an elongate cylindrical body 52. It is slightly enlarged at 54. This enables a lateral port to be constructed. The body 52 terminates at one end at an internal passage, there being a set of threads 56. The hollow body 52 further includes an axial passage 58. It serially connects with the end passage having the threads 56. The passage 58 is laterally intercepted by a drilled hole 60. The hole 60 is drilled at the enlargement. It is internally threaded at 62. The threads 62 provide a recessed tapped opening. It is particularly noteworthy that the threads 62 are within the body 52 which is cylindrical. This cuts down protrusions and obstructions extending from the drain fitting 50. Often, the drain fitting 50 must be used in tight circumstances. There is simply no room or access to permit and enable the connection of a drain hose or the like. It will be appreciated that the body 52 must be threaded by rotation to the valve 10. As it is rotated, there is the risk of interference with nearby components protruding from the valve body. This typically occurs in tight circumstances, as, for instance, where the body of the valve includes end located flanges and the flanges themselves are joined to a pipeline through large flange bolts.

The cylindrical body 52 is further constructed with the passage 58 extending to the right hand end. The passage extends to a packing nut 64. The nut 64 is threaded into a counterbored enlarged opening, and encloses a seal or a packing ring 66. The seal or packing ring is positioned adjacent to the smoothly threaded shaft 68. The shaft 68 terminates at the right hand end with a handle 70 for ease of rotation. The handle 70 is easily grasped and rotated to rotate the shaft. The shaft 68 passes through the packing nut 64. The shaft 68 does not thread to the packing nut; rather, it is surrounded by it to enclose the seal ring 66.

The shaft 68 is threaded at 72. The threads 72 mate with matching threads on the passage 58 on the right hand side of FIG. 2, particularly being located to the right of the lateral passage 60. On rotation, the shaft is advanced. When it is advanced, it moves to the left. The shaft 68 is thus forced to the left at a rate dependent on the pitch of the threads 72. It supports a stinger 74. The stinger 74 is an elongate rod sized to fit in the passage 22. It fits in the passage 22 with clearance. It has a length from the free end to a shoulder 76 which enables the stinger rod to pass along the passage 58 and into the passage 22 to contact the sphere 24 and thereby push the sphere away from the seat and defeat the check valve. This is illustrated in FIG. 2 where the stinger rod 74 is moved far to the left.

The check valve is defeated when the stinger rod in inserted against the check valve. This assists in draining the cavity 14.

The drain fitting 50 thus first attaches by threaded connection at the threads 56. After attachment, a hose or tubing is threaded to the lateral passage 60 at the threads 62. The next step in use of the drain fitting is to rotate the shaft 68 through the use of the handle 70 to advance stinger rod 74 into the check valve to defeat the check valve. The check valve is held in the defeated position shown in FIG. 2 indefinitely while pressure is applied to the cavity 14. This will force the resident grease in the cavity out and open the cavity for drainage. The drain fitting is held open to provide drainage of the cavity 14 indefinitely. After the cavity has been adequately drained, the drain fitting is removed. The typicaly sequence of operation is to first retract the stinger 74 to enable the check valve to seat and close. Thereafter, the laterally extending hose or drain line is removed from the thread 62 by unthreading. Then, the body 52 is removed by unthreading from the threads 56. The latter step can be accomplished by using a pipe wrench on the body 52 to unthread the drain fitting.

The drainage steps described above are ordinarily accomplished while simultaneously filling the cavity 14. Consider, as an example, the drainage of a heavy weight grease used in summer with a lighter weight packing grease having an antifreeze ingredient for use in winter time. The fill fitting 20 is installed in the illustrated manner. Its installation is achieved by threading the coupling 28. The coupling 28 is threaded until it is

VALVE SERVICE APPARATUS

BACKGROUND OF THE DISCLOSURE

The present apparatus is directed to service equipment for valves. In a large valve, the valve body surrounds the valve element. The element typically is a sliding gate or rotatable ball or plug. There is a volume within the valve which is a dead volume, not connected into the flow path. The dead volume is typically filled with a packing grease. The packing grease can vary widely in composition and in purpose. One purpose of the packing grease is to provide a seal lubricant which wets the seals working against the valve element. This will extend the life of the seals. An alternate purpose is to pack the cavity with a grease which is insensitive to a particular temperature range, as, for instance, low temperatures whereby filling with water carrying fluids is prevented. The grease, on exposure to cold temperatures, does not freeze and expand. This prevents damage to the valve body. Extreme damage can occur in the event the valve cavity is filled with water which is frozen, forming cracks in the valve body. There are other reasons for filling the cavity with a packing material.

On occasion, the packing material ought to be changed. It is almost impossible and extremely inconvenient to change the packing material in the cavity, as, for instance, by taking the valve out of service, disassembling the valve and draining the cavity. An alternate approach is installation of grease fittings such as Alemite fittings connecting from the exterior of the valve body to the cavity. The present invention utilizes fittings of this construction or a similar construction. They are typically fabricated into the valve body at the time of construction. They enable the grease or packing material to be inserted into the valve body, as, for instance, under pressure with a grease gun.

The magnitude of the problem cannot be understated. Consider, for instance, an extreme case, perhaps a 36" valve installed outdoors in a northern location. The ambient temperatures may vary from about 90° in the summer to perhaps minus 40° in the winter. This range of variation is extreme; the problems of sticking, expansion or contraction, and viscosity of the grease typically requires the use of a winter grease and a summer grease. A valve sufficiently large for a full bore 36" opening is extremely large, and has a body cavity which holds almost ten barrels of grease. It is a difficult proposition to drain the cavity of this valve. Moreover, it typically cannot be done by taking the valve out of service.

The present invention is an apparatus which enables the grease in a valve body to be changed. In particular, it enables new grease to be inserted under pressure while forcing the previous filled grease out of the body cavity. This is accomplished through the method described hereinbelow, namely, through the use of the fittings taught herein, and a method of draining and filling is thus also disclosed.

The fitting of the present disclosure which enables drainage of the valve cavity utilizes a coupling which threads to a check valve equipped fitting on the valve body. The end located coupling is internally threaded. The body of the apparatus is axially drilled and internally threaded. A stinger which is an elongate rod is mounted on the end of a larger diameter rod having external threads which is located in the passage in the body, and it terminates at the exposed end with a handle. The handle is rotated, thereby threading the stinger rod axially through the fitting and into the pre-existed fitting on the valve body. The stinger contacts and overcomes the check valve mechanism to thereby enable outward drainage. The body is constructed with an internally threaded laterally directed tap hole to permit a drainage hose to be jointed thereto for the purpose of conducting drain grease away to some kind of receptacle. The method of the present invention contemplates the steps of installing the drainage fitting connected to a valve cavity by overcoming the check valve mechanism therebetween to first establish a drainage path from the cavity to the exterior. An injection fitting is also installed in communication with the valve chamber thereby enabling grease to be introduced at another location for the purpose of replacing the grease within the valve chamber.

BRIEF DESCRIPTION OF THE DRAWINGS

So that the manner in which the above recited features, advantages and objects of the invention, as well as others which will become apparent, are attained and can be understood in detail, a more particular description of the invention briefly summarized above may be had by reference to the embodiments thereof illustrated in the appended drawings, which drawings form a part of this specification. It is to be noted, however, that the appended drawings illustrate only typical embodiments of the invention and are not to be considered limiting of its scope, for the invention may admit to other equally effective embodiments.

FIG. 1 is a representative valve having a valve body with cavity therein wherein the cavity is connected to the exterior through suitable fittings; and FIG. 2 is an enlarged view compared to FIG. 1 wherein an inlet fitting and outlet fitting constructed in the manner taught by the present disclosure are installed on the valve of FIG. 1 to provide inlet and outlet connections for the cavity.

DETAILED DESCRIPTION OF THE PREFERRED EMBODIMENT

Attention is directed to FIG. 1 of the drawings. There, the numeral 10 identifies a valve constructed to include a valve body 12 with an internal cavity 14. The valve typically includes valve element, the valve element rotating or sliding between open and closed positions. The cavity 14 is typically a space on the nonoperating side of the valve element whereby the chamber or cavity is filled with a packing grease. The valve 10 also includes an inlet and outlet and suitable seals. The valve cavity 14 is typically filled with grease for a multitude of purposes, and it is periodically serviced and removed through the means disclosed herein. The valve 10 further includes a first fitting 16 and a second similar fitting 18. The fittings 16 and 18 are arranged at different locations. Preferably, the fittings 16 and 18 are identical for convenience sake. They typically include an external threaded body having an axial passage. On the interior, they enclose resiliently triggered check valves. They are sometimes called Alemite fittings to refer to one source or brand. Other brands of fittings are also known which function in the same or similar manners. The significance of the fittings 16 and 18 is that they are provided on the valve body. They are closed by the check valve feature which is constructed within to prevent the escape of packing grease from the cavity 14.

seated whereby the passage 22 receives and connects with the passage 42. A feed line is attached to the right hand end of the fill fitting. The new packing grease is injected through the fill fitting and flows through the axial passages into the cavity 14. It will be appreciated that the filling steps are accomplished while the drain steps are carried out. Moreover, the delivery of new grease through the fill fitting provides a pressure drive to remove the pre-existing grease in the cavity 14. This drainage enables the interchange of one grease for another. Moreover, it defines a route of flow. When an adequate volume of the drained grease has flowed from the fitting 50, the process can then be terminated.

Several precautionary steps can be accomplished by the present invention. Assume, for instance, that the grease that is packed in the cavity is maintained under a pressure of 1,000 PSI. A pressure of this magnitude can create some risk to the operator. The drain fitting must be removed first to achieve final pressurization of the cavity 14. To this end, it is operated by retracting the stinger rod. The check valve is then permitted to operate so that pressure can be built up behind the check valve. Pressure is built up in the cavity 14 by maintaining the supply of grease at the elevated pressure. This raises the pressure of the cavity 14 to the desired level as measured by suitable pressure gauges connected to the fill line attached to the fill fitting 20. At this juncture, grease is held in the passages 22 and 42 at the elevated pressure. Should the fill line be disconnected from the fill fitting 20, there remains a small quantity of grease at the elevated pressure in the fill fitting 20. As the coupling 28 is unthreaded, it permits the nipple 38 to retreat to the right. As it does, relief of the internal passages is achieved where pressure drives the grease laterally and out the weep hole 40. When the weep hole 40 begins to flow packing grease, pressure released outside the check valve element 24 is accomplished. This will leave the cavity 14 filled to the requisite pressure level while reducing the pressure in the passage 22. As will be understood, a minute drainage is sufficient to drop the pressure. This is a safety step which is extremely important in assisting in removal of the fill fitting 20 in a safe manner.

As will be understood, the fill fitting and the drain fitting are constructed to have approximately equal flow rates through them. They are scaled so that the quantity of fluid flowing through one is approximately equal to the quantity permitted to flow through the other. They are ordinarily used in pairs but it is permissable, depending on the configuration of the cavity 14 and the pre-existing fittings to the cavity, to utilize two or more fittings for filling or draining simultaneously. The internal configuration of the cavity 14 fairly well determines this need.

The fittings 20 and 50 are relatively streamlined on the exterior, being devoid of lateral protrusions. This is particularly important to enable installation of both fittings in a variety of working circumstances.

While the foregoing is directed to the preferred embodiments, the scope of the present invention is determined by the claims which follow:

I claim:

1. For drainage of a cavity within a valve body wherein the valve body has first and second check valve fittings communicating from the exterior to the cavity, an apparatus which comprises:

(a) a fill fitting including:
      1. an end-located threaded coupling having a mating joinder means to enable said coupling to be engaged with a check valve fitting opening into the cavity;
      2. an elongate body secured by said coupling, said body having an axial internal passage communicated with an opening against the check valve fitting to introduce fluid flow therethrough;
      3. an end-located connector on said body to enable connection with a pump delivering fluid for the cavity therethrough; and
      4. a weep hole extending through said coupling which is selectively communicated with said axial passage on disconnecting said coupling to enable pressure relief to fluid outside the check valve fitting and in said axial passage; coupling;
   (b) a drain fitting which includes:
      1. an elongate body having an external surface defined by a diameter enabling said body to be grasped by a hand tool such as a pipe wrench;
      2. a tapped end-located hole in said body sized to thread to a check valve fitting opening into the cavity;
      3. an axial internal passage along said body;
      4. an elongate rod positioned in said passage, said rod held in said passage by mating threads which advance or retract the rod on rotation;
      5. an end-located stinger rod portion on the end of said rod and having a length to extend through said passage within said body and to further extend in retractable fashion from said body into the check valve fitting where said stinger rod is adapted to contact the check valve and thereby defeat the check valve by forcing the check valve element open;
      6. a lateral passage formed in said body;
      7. joinder means cooperative with said lateral passage to enable a drain hose to be joined to said body, said lateral passage defining in conjunction with said axial passage a flow path from the check valve fitting for drainage; and
      8. means for rotating said rod to advance or retract said rod between operative and nonoperative positions.

2. The apparatus of claim 1 including a packing nut and seal member in the end of said body and surrounding said rod.

3. The apparatus of claim 1 wherein said fill fitting incorporates a serially connected check valve means therein connected to said axial passage.

4. The apparatus of claim 1 wherein said fill fitting weep hole is formed through said coupling and communicates from the interior to the exterior thereof and is located adjacent the end of said axial passage within said elongate body to define a flow path from said axial passage through said coupling to the exterior thereof.

5. The apparatus of claim 1 wherein said drain fitting body is generally cylindrical in exterior shape and wherein said lateral passage formed therein intersects said axial passage therethrough and thereby enables drained fluid to flow from said lateral passage after installation of said drain fitting and said lateral passage has a length limited by the diameter of said drain fitting body.

* * * * *